United States Patent [19]
Chang et al.

[11] Patent Number: 5,719,996
[45] Date of Patent: Feb. 17, 1998

[54] SPEECH RECOGNITION IN SELECTIVE CALL SYSTEMS

[75] Inventors: Lu Chang, Boca Raton; Yan-Ming Cheng, Lake Worth, both of Fla.

[73] Assignee: Motorola, Inc., Schaumburg, Ill.

[21] Appl. No.: 491,329

[22] Filed: Jun. 30, 1995

[51] Int. Cl.⁶ .................................................. G10L 5/06
[52] U.S. Cl. ........................ 395/2.65; 395/2.63; 395/2.62; 395/2.47; 395/2.52
[58] Field of Search .......................... 395/2.65, 2.62, 395/2.49

[56] References Cited

U.S. PATENT DOCUMENTS

| | | | |
|---|---|---|---|
| 4,783,804 | 11/1988 | Juang et al. | 395/2.54 |
| 4,905,287 | 2/1990 | Segawa | 395/2.63 |
| 4,977,599 | 12/1990 | Bahl et al. | 395/2.65 |
| 5,033,087 | 7/1991 | Bahl et al. | 385/2.65 |
| 5,193,142 | 3/1993 | Zhao | 395/2.09 |
| 5,202,952 | 4/1993 | Gillick et al. | 395/2.09 |
| 5,230,037 | 7/1993 | Giustiniani et al. | 395/2.09 |
| 5,473,728 | 12/1995 | Luginbuhl et al. | 395/2.52 |

OTHER PUBLICATIONS

"An Algorithm for Vector Quantizer Design" IEEE Transactions on Communications, vol. COM.28, No. 1 Jan. 1980.

*Primary Examiner*—Allen R. MacDonald
*Assistant Examiner*—Vijay B. Chawan
*Attorney, Agent, or Firm*—Keith A. Chanroo

[57] ABSTRACT

A selective call communication system (100) has a speech recognition system using an acoustic space (400) which has a plurality of probability density functions (pdfs). The selective call communication system (100) has an acoustic space generator (136) for representing speech in the acoustic space (400) which has a plurality of regions (1–14) having a subset of the plurality of probability density functions (502–516). The selective call communication system (100) has a tree generator (138) for generating a hierarchical tree structure (500) representing the subset of the plurality of probability density functions (502–516) associated with the plurality of regions (1–14), a score computer (132) for determining a region of the plurality of regions (1–14) indicative of a minimum distance to a center of the region for a speech sample received, and a speech recognizer (130) for calculating the probability density functions of the region for recognizing the speech sample received.

20 Claims, 5 Drawing Sheets

| 202 SUBSCRIBER ID | 204 PAGER ADDRESS | 206 VOICE USER ID |
|---|---|---|
| 1 2 3 4 5 | 7 7 5 5 6 6 | "BILL" |
| ⋮ | ⋮ | ⋮ |
| 1 2 3 7 8 | 9 7 8 8 1 1 | "MARY" |
| ⋮ | ⋮ | ⋮ |

SPEECH RECOGNITION IN SELECTIVE CALL SYSTEMS

FIELD OF THE INVENTION

This invention relates in general to communication systems and more specifically to speech recognition in a selective call communication system.

BACKGROUND OF THE INVENTION

For high-performance speech recognition systems, continuous probabilistic density functions (pdf) are generally used because of their powerful modeling capacity. One widely used pdf is the Gaussian density function. However, the evaluation of Gaussian pdf involves many multiplication and additions. A speech recognition system has to calculate thousands of Gaussian pdfs to adequately model speech signals. As a result, the computations of the pdfs consume more than ninety percent (90%) of the processing time which causes a bottle-neck of real time application of speech recognition technology.

This bottle-neck can be overcome by using extremely fast processors or computers operating in parallel to reduce the time for calculating the large number of pdfs to model the Speech. Unfortunately, using fast processors or computers operating in parallel do not provide cost effective methods for implementing speech recognition in consumer communication devices that have to be price competitively to become commercial viable.

DESCRIPTION OF A PREFERRED EMBODIMENT

Figure 1:
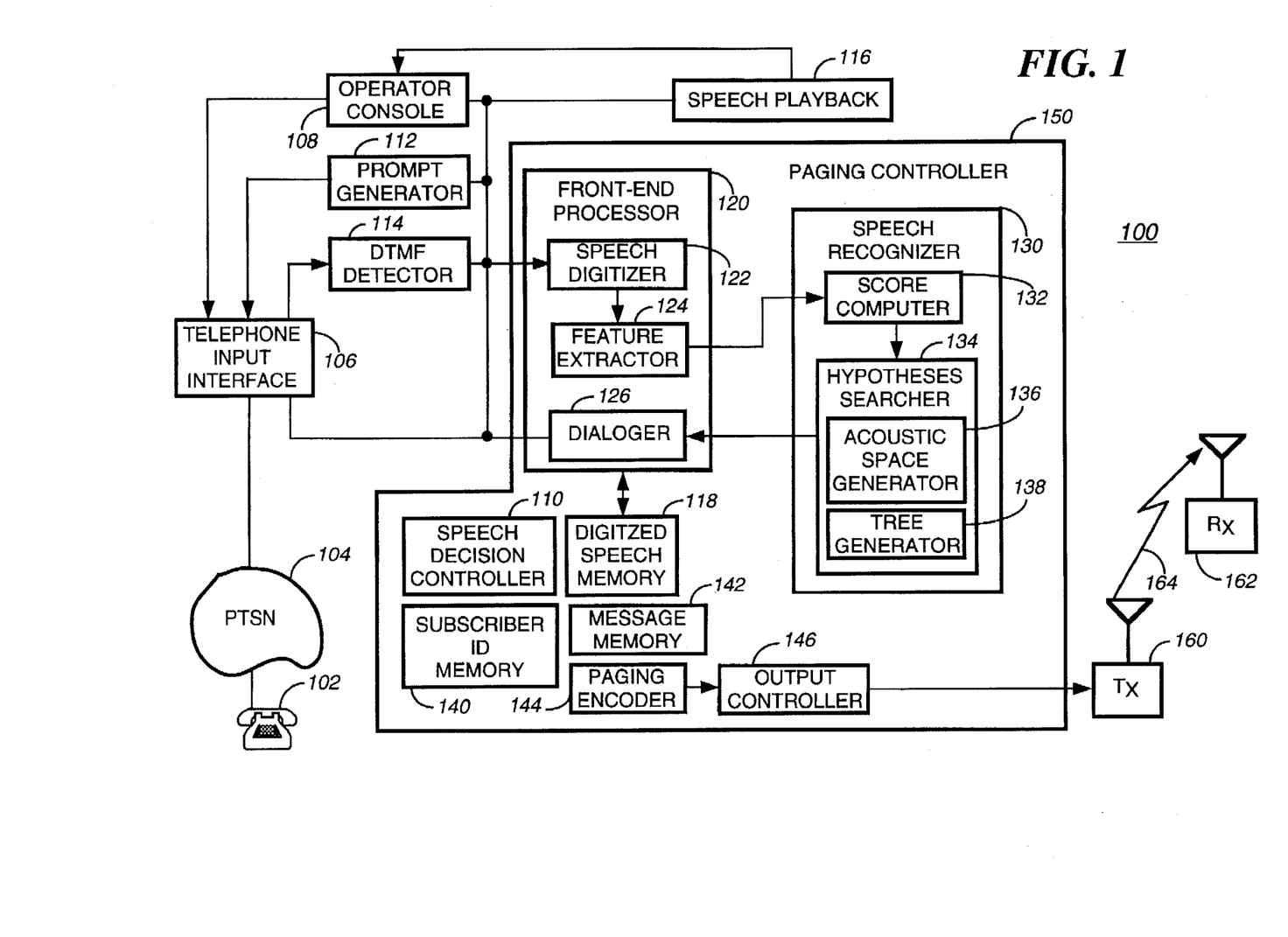
FIG. 1 is an electrical block diagram of a selective call communication system in accordance with a preferred embodiment of the present invention.

FIG. 1 shows an exemplary selective call communication system, e.g., an exemplary paging system, in accordance with a preferred embodiment of the present invention. The general operation of a communication system of the type shown in FIG. 1 is described in U.S. Pat. No. 5,138,311, issued Aug. 11, 1992, entitled, "Communication System Having Adaptable Message Information Formats", which is assigned to the same assignee as the present invention and is incorporated herein by reference. A telephone caller 102 accesses a telephone input interface 106, e.g., a paging input 106, of the selective call communication system 100 via a public switched telephone network (PSTN) 104. Once the caller 102 connects with the telephone input interface 106 of the system 100, the caller 102 can access functions of the communication system 100 which are controlled by a paging controller (controller) 150. A prompt generator 112 provides prompts to the telephone interface 106 which are then coupled to the telephone caller 102. A prompt can be a tone or a series of tones. It can alternatively be a synthesized voice prompt that is coupled to the caller 102. In a third alternative, a prompt can be a model communication sequence. The prompt generator 112 provides signaling to the caller 102 to generally guide the caller through an input sequence.

A detector 114 can detect incoming Dual Tone Multi-Frequency (DTMF) signaling from the caller 102. Optionally, the detector 114 can include a modem signaling the detector to receive modem communication from the caller 102.

It is well known to one of ordinary skill in the art that subscribers of the selective call communication system 100 are identified by subscriber IDs (or a subscriber PINs) which can be entered by the caller 102 while entering a request into the system 100 to selectively send a page including a message, for example a voice message, to the identified subscriber. The subscriber ID can be entered into the system 100 by the caller 102 using the detector 114, such as by using DTMF signaling or optionally using modem signaling or, preferably, by speaking a voice user ID into the communication system 100. The voice user ID is associated with the subscriber ID stored in the subscriber ID memory 140 such that the caller 102 can simply speak through the telephone input interface 106 into the system 100 to select a particular subscriber as the recipient of a message. To effect this selection, the system 100 uses voice recognition technology to reliably determine that a particular voice user ID has been selected from an incoming voice data from the caller 102. After a subscriber has been identified and selected from the entered voice user ID, the caller 102 can input a voice message which is processed by using voice recognition technology, to be discussed below, and stored in a message memory 142 to be sent to the subscriber designated by the subscriber user ID. On the other hand, if the speech decision controller 110 cannot determine a likely match to any one of the Voice User ID's with the subscriber ID memory 140, then the controller 150 can alert a system operator through the operator console 108 and can route the voice data from the memory 118 to the speech playback unit 116 to allow the system operator to hear the caller's digitized speech. If the system operator can understand the caller's selection then the system operator through the console 108 can enter the subscriber ID information and provide that information to the controller 150.

For example, the system operator after hearing the playback, can effect a lookup function by the controller 150 on the subscriber ID memory 140 to determine if there is a match. This can be accomplished, for example, by the operator inputting a lookup request at a user interface, e.g., a keyboard, at the console 108. A video display at the console 108 would display the result of the lookup function. The system operator through the console 108 can then communicate the selected subscriber ID to the controller 150. This lookup process can be accomplished quickly while the caller 102 remains on the line waiting for a decision. Therefore, the system operator could perform the lookup procedure without inconveniencing the caller 102.

However, if the system operator is not able to find a match in the memory 140, then the system operator can override the controller 150 and switch in an audio path with the telephone input interface 106 to directly communicate with the caller 102 and manually process the caller's request. This normally would be a last resort. Typically, the caller's request would be processed automatically by the system 100, without requiring intervention by a system operator. Therefore, the operation of this system 100 would normally be fast and efficient, and with minimal inconvenience to a caller 102. This enhances the commercial viability of the system 100.

Figure 2:
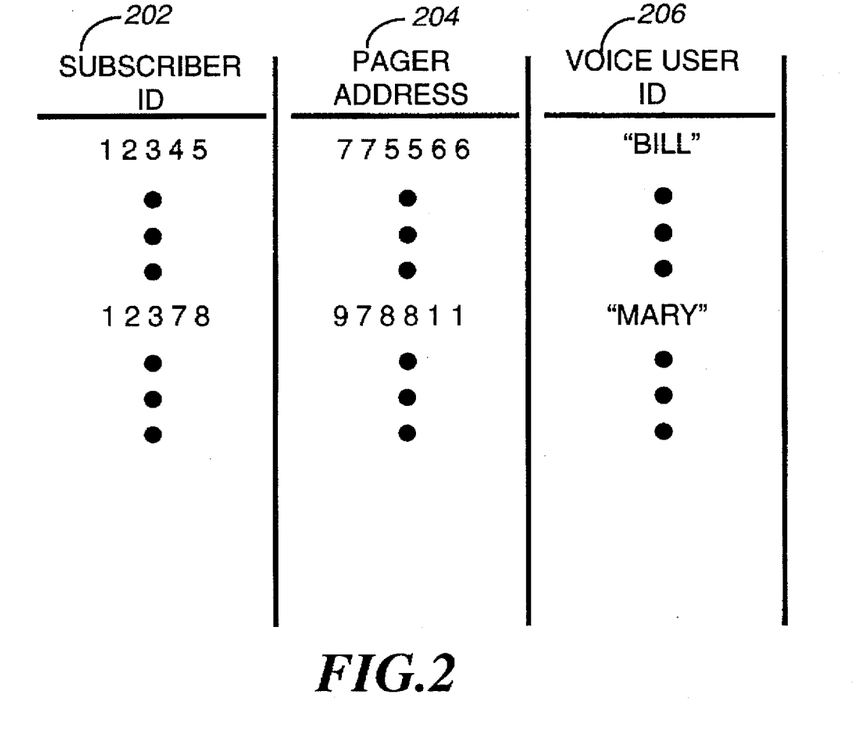
FIG. 2 illustrates an exemplary database organized for subscribers of the selective call communication system of FIG. 1.
Figure 3:
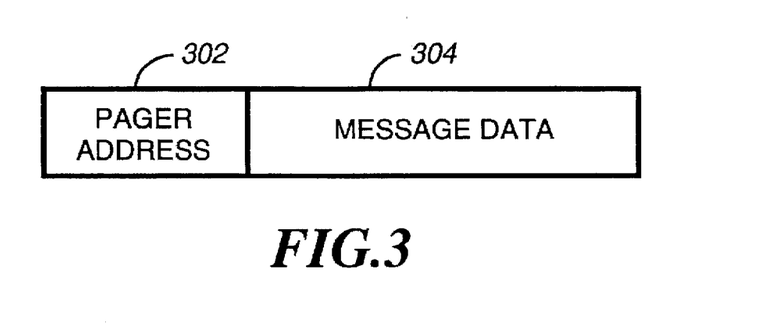
FIG. 3 is a message block diagram illustrating an exemplary message for the selective call communication system of FIG. 1.

Referring to FIG. 2, the subscriber ID memory 140 is preferably organized for each subscriber of the system 100 to associate a subscriber ID 202 with a pager address 204 and a Voice User ID 206. For example, the subscriber ID "12345" is associated with selective call receiver (pager) address "775566". The selective call receiver address 204 selects a particular recipient of a message in the system 100. Specifically, a selective call receiver address 204 is coupled with a message data to provide a message that is sent to a selective call receiver 162 (FIG. 1). An example of a selective call message is illustrated in FIG. 3. There, a pager address information 302 is coupled to a message data 304 to form a message which can be transmitted from the system 100 over the communication channel 164 to select one or more remote units, for example selective call receivers 162. The one or more selected remote Units 162 would then receive the page and extract the message data 304. Referring back to FIG. 2, the subscriber ID "12345" is associated with a Voice User ID 206 representing the speech for the name "Bill."

Referring back to FIG. 1, a paging encoder 144 encodes the messages into selective call communication protocols, such as the POCSAG (Great Britain's Post Office Code Standardisation Advisory Group) protocol or Motorola's FLEX™ protocol. An output controller 146 couples the encoded messages to one or more transmitter base stations 160 which can then deliver the messages over a communication channel 164 to one or more remote units 162. These remote units 162 are capable of selectively receiving messages that are addressed to specific remote units 162, for example, selective call receivers. The operation of selective call receivers of the general type shown in FIG. 1 is well known and is more fully described in U.S. Pat. No. 4,518, 961 issued May 21, 1985, entitled "Universal Paging Device With Power Conversation", which is assigned to the same assignee as the present invention and is incorporated herein by reference.

The paging controller 150 preferably comprises a speech digitizer 122, a feature extractor 124, a score computer 132, a hypotheses searcher 134, and a dialoger 126. Real-time speech processing is preferably accomplished by a front-end processor 120 (which preferably includes the speech digitizer 122, the feature extractor 124 and the dialoger 126) and a speech recognizer 130 (which preferably includes the score computer 132 and the hypotheses searcher 134.) The speech digitizer 122 receives and digitizes incoming speech (voice data, including the subscriber ID and the corresponding voice message) from the caller 102 which are stored in, for example, a digitized speech memory 118. The feature extractor 124 uses, for example, a Fast Fourier Transform (FFT) or Linear Predictive Coding (LPC), to extract, from the speech data, characteristic features that are significant to human auditory system, for example, frequency response, loudness, format structures, etc. The score computer 132 of the speech recognizer 130 computes the likelihood of the features (likelihood scores) of the models used to recognize the speech data stored in memory. The hypotheses searcher 134 uses the likelihood scores calculated by the score computer 132 to find most likely word sequences in performing the speech recognition. The dialoger 126 interacts or administrates a dialog with the caller 102 by asking additional questions or requesting the caller to enter certain codes to ensure proper responses or that all the information are received. The hypotheses searcher 134 comprises an acoustic space generator 136 for generating the acoustic space 400 shown in FIG. 4.

Figure 4:
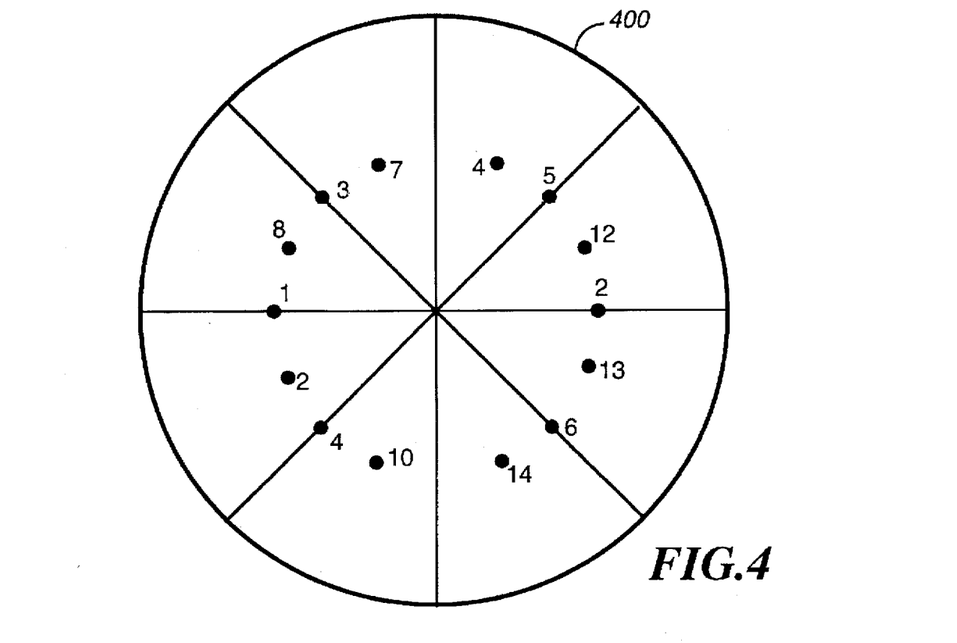
FIG. 4 is a representation of an acoustic space subdivided into regions in accordance with the preferred embodiment of the present invention.

Referring to FIG. 4, the acoustic space is shown according to the preferred embodiment of the present invention. The acoustic space 400 is represented as a circle 400 which comprises all possible words including at least one probability density function (pdf) for modeling each word, for example, words to be used with the communication system 100. The acoustic space (circle) 400 is divided into a plurality of regions (1 through N) and more particularly 1–14. Each region contains a predetermined number of words (or a list of probability density functions, pdfs) of the total number of words in the acoustic space 400. A word is generally modeled with more than one pdfs. The regions 1–14 can share common pdfs because the regions overlap, e.g., some pdfs have a distance measure that comprises a minimum distance to the node center of more than one regions to cause them to be included in more than one region of the acoustic space 400. Depending on the speech model used for modeling the speech, for example, the Hidden Markov Model representation (HMM), words or pdfs are categorized to be in at least one region of the acoustic space 400 depending on the distance (or distance measure) of the word or pdfs from the node center. A particular node center or center is the center of a region (or subregion) of the acoustic space 400. The center or node center has a list of probability density functions (pdD 502–516 (see FIG. 5) assigned to each region based upon the modeling characteristics (minimum distance to the node center), using for example HMM. The pdfs are associated to the t-IMM. When all the pdfs are generated, a list of pdfs having minimum distances in a region is assigned to the center of that region. From the regions of the acoustic space 400, a hierarchical tree structure is generated to more quickly determine the region of the plurality of regions 1–14 where a word or a pdf belongs.

Figure 5:
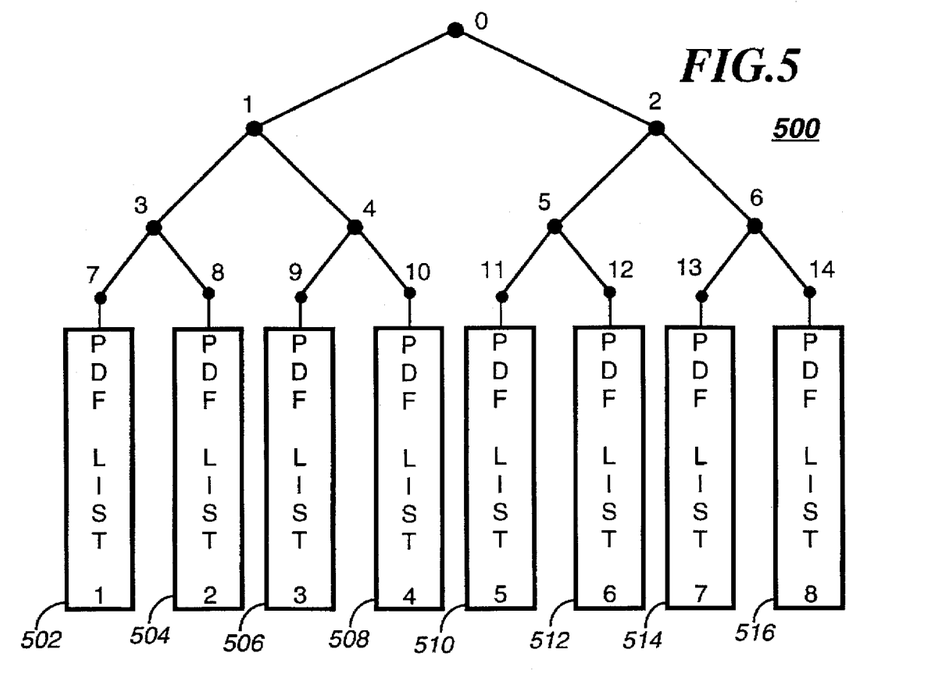
FIG. 5 is a hierarchical tree structure representation of the subdivisions of the acoustic space according to FIG. 4.

Referring to FIG. 5, the hierarchical tree structure is shown representing a fast method for determining a subset of the pdfs according to the preferred embodiment of the present invention. In generating the hierarchical tree structure to determine the list (or subset) of pdfs of each region, the acoustic space 400 is divided into regions (subregions) 1–14 having centers 0-M. Referring to FIG. 4, the center of acoustic space 400 before the acoustic space 400 is subdivided has a node center 0. When the acoustic space 400 is divided into two parts according to some distance measure, centers 1 and 2 are determined, and when the acoustic space 400 is divided into four part, new centers 3–6 are determined. A further subdivision of the acoustic space 400 into eight parts, according to the distance measure, results in new centers 7–14. Referring back to FIG. 5, the hierarchical tree structure 500 is determined from the subdivisions of the acoustic space 400. Node 0 of the hierarchical tree structure 500 represents the center 0 of the acoustic space 400 before any subdivision. Nodes 1 and 2 of the hierarchical tree structure represent the centers 1 and 2 when the acoustic space 400 is divided into two equal parts. Nodes 3 to 6 of the hierarchical tree structure represent the center 3–6 of the acoustic space 400 divided into four equal parts and nodes 7 to 14 of the hierarchical tree structure 500 represent the centers 7–14 of the acoustic space 400 divided into eight equal parts. If, for example, the subdivision of the acoustic space 400 ends at eight regions, then the hierarchical tree structure is generated with the lists or the plurality of probability density functions (pdfs) 502–516 located at nodes 7–14 respectively. Therefore, when a speech sample data is received, the speech sample data is determined to belong to one of the eight regions of the acoustic space 400 where the speech sample data has a distance measure equaling a minimum distance from the node center of the region. To make the minimum distance determination, for each speech sample data, the hierarchical tree structure is traversed and when one of the terminating nodes 7–14 is reached, the region in which the speech sample data has the minimum distance is calculated. The pdfs in the list of pdfs are calculated to determine scores for representing the speech data received.

In this way, speech processing time is reduced because most of the time in real time speech processing is spent on calculation of the pdfs. Therefore, by subdividing the acoustic space 400 into N regions and generating a hierarchical tree structure therefrom having 0-M nodes with each terminating node having a subset of the pdfs, the speech sample data can be determined to reside into one of the region 1-N which identifies the subset of pdfs (list) to be calculated. The hierarchical tree structure specifies the relationship between regions of the acoustic space. Nodes centers are features that characterize the speech data in the region. The list of pdfs at the terminating node of the hierarchical tree structure have or include the pdfs that have the minimum distance to the node center of that region. The greater the number of regions of the acoustic space 400, the more terminating nodes will be generated on the hierarchical tree structure resulting in the need to calculate fewer pdfs for a given list. Since fewer pdfs will be calculated, the speech sample data will be computed much faster which provides the option to reduce the processing speed required and the ability to use a smaller processor to perform the speech recognition.

Figure 6:
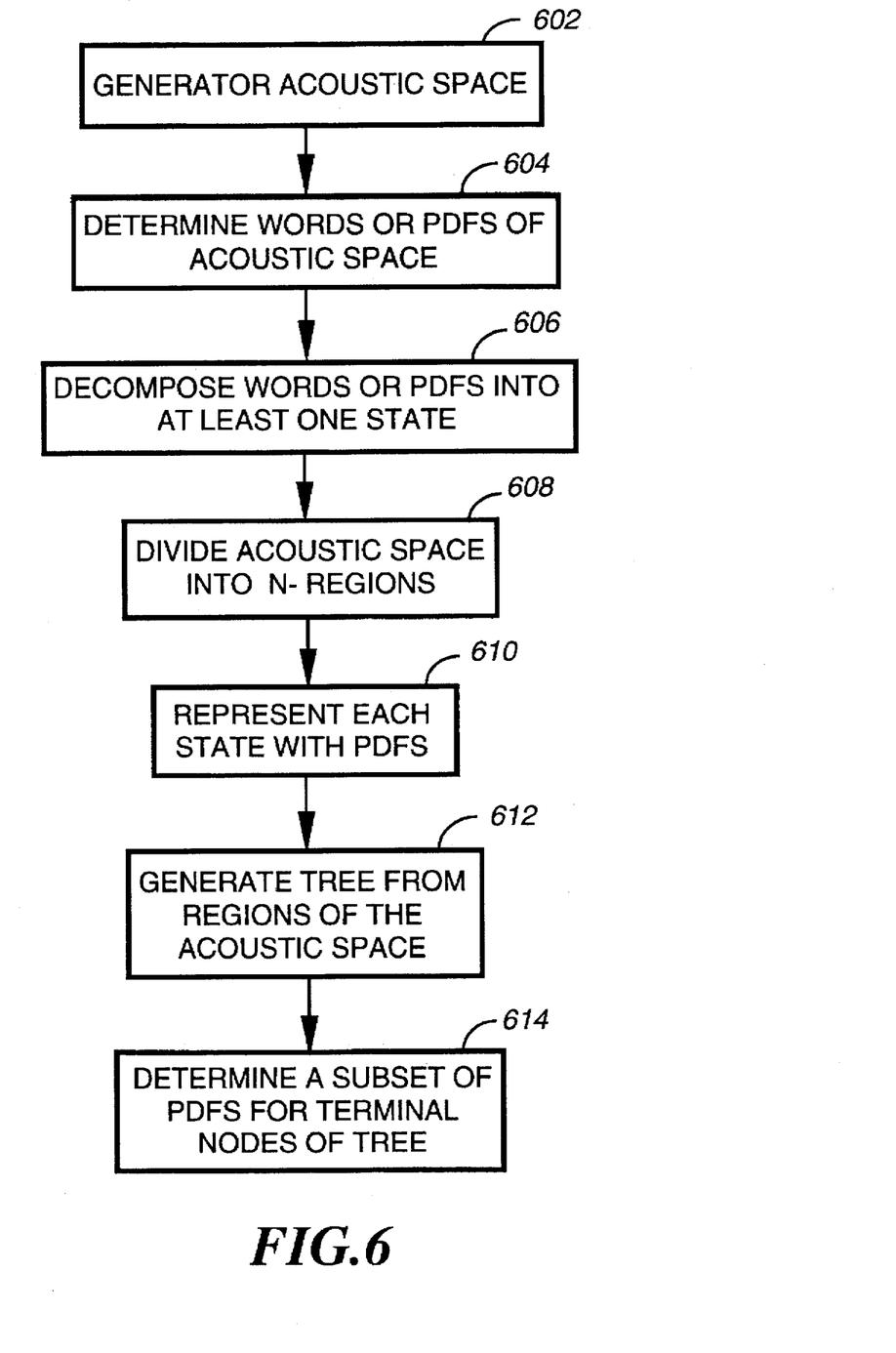
FIG. 6 is a flow diagram illustrating the generation of the acoustic space and the hierarchical tree structure in accordance with the preferred embodiment of the present invention.

Referring to FIG. 6, a flow diagram illustrates the generation of the acoustic space and hierarchical tree structure according to the preferred embodiment of the present invention. The acoustic space generator 136 generates partitions for representing of the acoustic space 400 in FIG. 4, step 602, to include all possible words that may be used in the communication system, step 604, as described above. It is understood by one of ordinary skill in the art that the number of word generated for the acoustic space 400 is limited by the processor's capability of the communication system. Therefore, the more words generated for the acoustic space 400, the more universal is the recognition system. The words are decomposed into at least one state determined by the speech model, for example, HMM, step 606. The number of states each word is decomposed into is representative of the phoneme of each word. The acoustic space 400 is then divided into N regions, each region being assigned a subset of words or pdfs, step 608. Each state is represented by at least one pdf according the HMM model, step 610. The tree generator 138 generates the hierarchical tree structure shown in FIG. 5 as described above in reference to FIG. 1, step 612. A subset of pdfs are determined for each terminal nodes 7–14 of the hierarchical tree structure, step 614. Therefore, when a speech sample data is received, the speech sample data is determined to belong to one of the eight terminal node 7–14 of the hierarchical tree structure 500 indicating that the speech sample data has a minimum distance from the node center of the region. To make the minimum distance determination, for each speech sample data, the hierarchical tree structure is traversed and when one of the terminating nodes 7–14 is reached, the minimum distance is determined to be in the region corresponding to the terminating node. For example, the region in which the speech sample data has the minimum distance to the center of the region. The pdfs in the list are calculated to determine a model for representing the received speech data.

Figure 7:
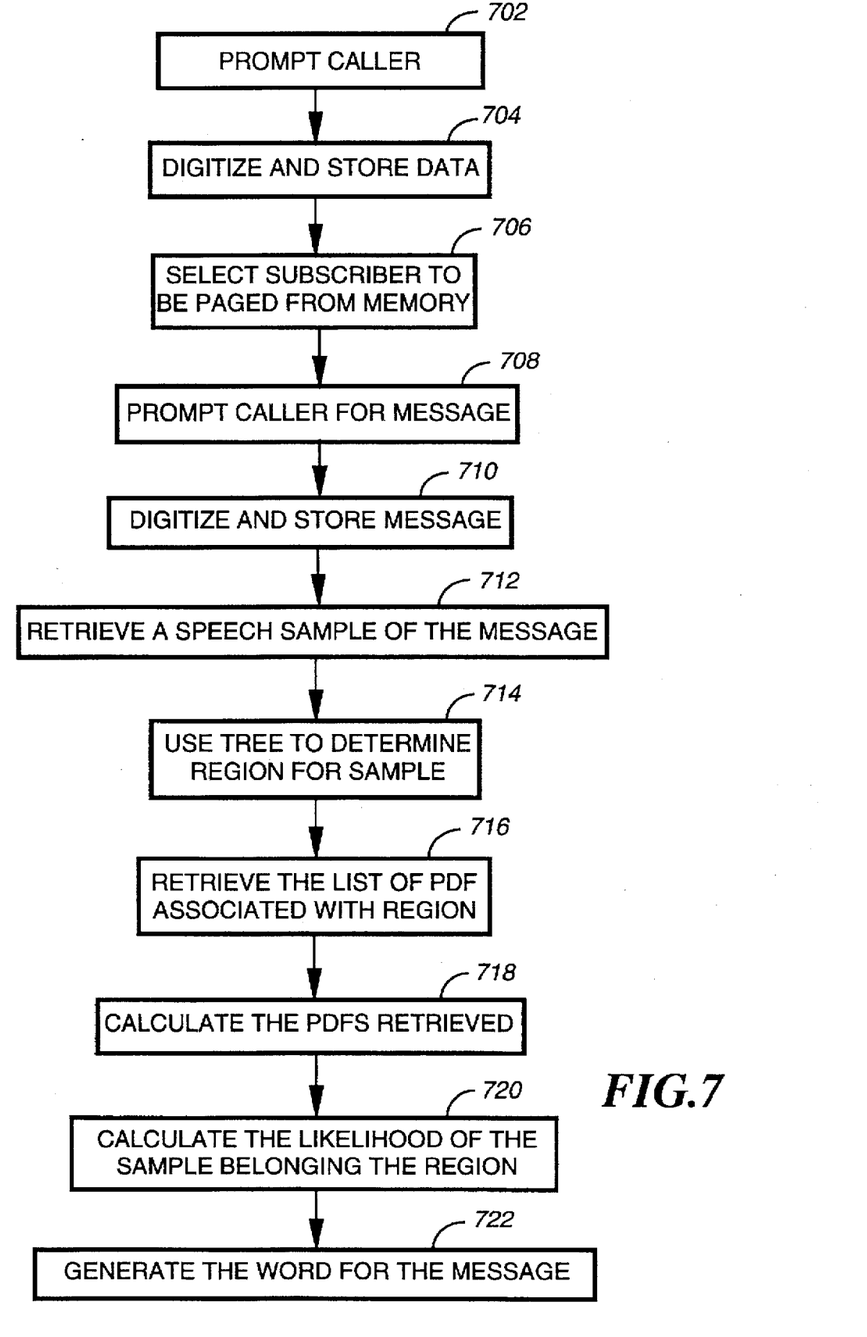
FIG. 7 is a flow diagram illustrating a voice recognition system of the selective call communication system in accordance with the preferred embodiment of the present invention.

Referring to FIG. 7, a flow diagram illustrating a fast method of performing real time speech recognition according to the preferred embodiment of the present invention. When a caller accesses the system to send a voice message, the system 100 prompts the caller 102 to speak the caller's selection of a voice user ID corresponding to a subscriber ID, step 702. The system 100 then digitizes and stores the voice data received from the caller 102, step 704. The speech recognizer 130 performs voice recognition to compare the voice data to the voice user IDs. The controller 150 then decides, at step 706, whether a match is found and if so, retrieves the subscriber ID.

The system 100 then, at step 708, prompts the caller 102 to enter a corresponding message to be sent to the subscriber to be paged. This can be handled, for example, by using conventional DTMF signaling from the caller's telephone device. The speech data or speech sample is received and the speech digitizer 122 digitizes the speech data which is stored in the message memory 142, at step 710. The message stored in the message memory 142 is retrieved in a predetermined sample lengths, speech sample, step 712, and the feature extractor 124 uses, for example, FFT or LPC, to extract from the speech data, characteristic features that are significant to human auditory system, for example, frequency response, loudness, format structures, etc. The speech recognizer 130 traverses the hierarchical tree structure 500 to determine the region of the acoustic space to which the speech sample belongs, step 714. Once the region is determined, the list of pdfs associated the regions are retrieved, step 716. From the list of pdfs, the score computer 132 computes or calculate the likelihood of the features (likelihood scores) of the pdfs associated with the list to be used to recognize the retrieved speech data, step 718. The hypotheses searcher 134 uses the likelihood scores calculated by the score computer 132 to find the most likely word sequences in performing the speech recognition, step 720. From the likelihood sequences, the speech recognizer 130 generates hypothesized word sequences of the message, step 722.

In this way, real time speech processing is achieved in a cost effective manner without dedicating too much processing for calculating an exhaustive number of probability density functions for modeling the received speech data to recognize the voice message. By dividing the acoustic space into regions associated with a reduced number (subset) of pdfs of the plurality of pdfs having a minimum distance to the center of the regions, only the reduced number of pdf needs to be calculated for each speech sample. The minimum distance can be quickly determined by traversing the levels of the hierarchical tree structure. When the terminal node is reached, the pdfs associated therewith comprise the pdfs having a minimum distance. Since there are N regions then the pdfs determined per regions is much less than the pdfs of the entire space where results in a significant reduction in the number of pdfs to be calculated thereby decreasing the time spent by the processor. Selecting the pdfs based on the minimum distance to the regions results in no appreciable loss of the performance in the speech recognition system.

In summary, a method for speech recognition uses an acoustic space that has a plurality of probability density function (pdfs). The method comprises the steps of dividing the acoustic space into at least two regions, each region has a center comprising a list of the pdfs of the plurality of pdfs generated by Hidden Markov Models (HMM). The method further comprises generating a hierarchical tree structure associated with the at least at regions of the acoustic space, receiving speech data forming a received speech data, using the hierarchical tree structure for determining a region of the at least two regions in which the received speech data has a minimum distance from the center, retrieving the list of pdfs associated with the region, and calculating the pdfs for determining the likelihood of the speech data belonging to the pdfs of the region.

What is claimed is:

1. A method for performing speech recognition by using an acoustic space having a plurality of probability density functions (pdfs), comprising the steps of:

dividing the acoustic space into a plurality of regions;

determining at least one region of the plurality of regions to which a probability density function belongs by determining when the probability density function has a minimum distance to the at least one of the plurality of regions wherein the probability density functions of each region comprise a subset of the plurality of probability density functions;

generating a hierarchical tree structure representing the subset of the probability density functions associated with the plurality of regions;

receiving a speech sample;

determining the region of the plurality of regions by traversing the hierarchical tree structure in which the speech sample has the minimum distance to a center of the region; and calculating the subset of probability density functions of the region for recognizing the speech sample received.

2. The method according to claim 1 wherein the step of representing comprises a step of calculating the probability density function using Hidden Markov Model representation.

3. The method according to claim 1 wherein the step of calculating comprises a step of retrieving a list of probability density functions assigned to the region determined to have the minimum distance to the speech sample received.

4. The method of claim 1 wherein the step of determining further comprising a step of using the hierarchical tree structure to determine the minimum distance to the speech sample received.

5. The method of claim 4 wherein the step of using further comprising the steps of:

successively calculating a distance measure at each node of the hierarchical tree structure; and determining the region of the plurality of regions wherein the speech sample received has a minimum distance from the center of the region.

6. The method according to claim 1 wherein the step of determining further comprises the step of receiving a speech sample corresponding to a pdf.

7. The method according to claim 6 wherein the step of receiving further comprising:

dividing the speech sample received into a multiplicity of speech samples; and assigning at least one state to each of the multiplicity of speech samples.

8. A method for performing speech recognition by using an acoustic space having a plurality of probability density functions (pdfs), comprising the steps of:

dividing the acoustic space into an at least two regions, the at least two regions;

determining a region of the at least two regions to which a probability density function belongs by determining when the probability density function has a minimum distance from a center of one of the at least two wherein the probability density functions of each region comprises a subset of the plurality of probability density functions;

generating a hierarchical tree structure associated with the at least two regions of the acoustic space wherein the at least two regions having a center comprising a list of pdf of the plurality of pdfs generated by Hidden Markov Model (HMM);

receiving a speech data;

using the hierarchical tree structure for determining a region of the at least two regions in which the received speech data has a minimum distance from the center;

retrieving the list of pdfs associated with the region; and calculating the pdfs from the list of pdfs for determining a likelihood of the received speech data belonging to the pdfs of the region.

9. The method of claim 8 wherein the step of using further comprising the steps of:

successively calculating a distance measure at each node of the hierarchical tree structure; and determining the region of the at least two regions wherein the received speech data has a minimum distance from the center of the region.

10. The method according to claim 8 wherein the step of receiving further comprising:

dividing the received speech data into a multiplicity of speech samples; and assigning at least one state to each of the multiplicity of speech samples.

11. A selective call communication system having speech recognition using an acoustic space comprising a plurality of probability density functions (pdfs), the selective call communication system, comprising:

an acoustic space generator for representing speech in the acoustic space, the acoustic space is divided into a plurality of regions, each of the plurality of regions having a subset of the plurality of probability density functions, the subset of the plurality of probability density functions are associated with a region of the plurality of regions by determining when a probability density function has a minimum distance to the region;

a tree generator for generating a hierarchical tree structure representing the subset of the plurality of probability density functions associated with the plurality of regions;

a score computer for determining the region of the plurality of regions by traversing the hierarchical tree structure in which the speech sample has the minimum distance to a center of the region; and a speech recognizer for calculating the subset of the plurality of probability density functions of the region for recognizing the speech sample received.

12. The selective call communication system according to claim 11 wherein the speech recognizer calculates the plurality of probability density functions using Hidden Markov Model representation.

13. The selective call communication system according to claim 11 wherein the speech recognizer comprises a hypotheses searcher for retrieving a list of probability density functions assigned to the region determined to have the minimum distance to the speech sample received.

14. The selective call communication system of claim 11 wherein the score computer uses the hierarchical tree structure generated by the tree generator to determine the minimum distance to the speech sample received.

15. The selective call communication system of claim 14 wherein the score computer calculates a distance measure at a node of the hierarchical tree structure for determining the region of the plurality of regions wherein the speech sample received has a minimum distance from the center of the region.

16. The selective call communication system according to claim 11 further comprising a front-end processor for receiving speech samples.

17. The selective call communication system of claim 16 wherein the front-end processor further comprising:
    a speech digitizer for dividing the speech samples into a multiplicity of speech samples; and
    a feature extractor, coupled to the speech digitizer, for determining characteristic features of the multiplicity of speech samples that are significant to human auditory system.

18. A selective call communication system for performing speech recognition using an acoustic space having a plurality of probability density functions (pdfs), the selective call communication system comprising:
    an acoustic space generator for representing speech in the acoustic space and dividing the acoustic space into at least two regions and assigning each region a center, a list of the plurality of probability density functions are associated with a region of the plurality of regions by determining when a probability density function has a minimum distance from the center of the region;
    a tree generator for generating a hierarchical tree structure associated with the at least two regions of the acoustic space;
    a front-end processor for receiving speech data;
    a speech recognizer for using the hierarchical tree structure for determining a region of the at least two regions in which the received speech data has the minimum distance from the center;
    a score computer for retrieving the list of the plurality of pdfs associated with the region; and
    a hypotheses searcher for calculating pdfs from the list of the plurality of pdfs using the hierarchical tree structure for determining a likelihood of the speech data belonging to the plurality of pdfs of the region.

19. The selective call communication system of claim 18 wherein the speech recognizer determines the region by successively calculating a distance measure at a node of the hierarchical tree structure; and
    the tree generator, responsive to the acoustic space generator, determines the region of the at least two regions wherein the received speech data has a minimum distance from the center of the region.

20. The selective call communication system according to claim 18 wherein the front-end processor further comprising:
    a digitizer for dividing the speech data into a multiplicity of speech samples; and
    a feature extractor for assigning at least one state to each of the multiplicity of speech samples.

* * * * *